United States Patent [19]
Edwards et al.

[11] Patent Number: 6,115,572
[45] Date of Patent: Sep. 5, 2000

[54] SYSTEM FOR REGISTRATION OF COLOR SEPARATION IMAGES ON A PHOTOCONDUCTOR BELT

[75] Inventors: William D. Edwards, Houlton, Wis.; Michael R. Bury, White Bear Lake; Truman F. Kellie, Lakeland, both of Minn.

[73] Assignee: Imation Corp., Oakdale, Minn.

[21] Appl. No.: 08/999,755

[22] Filed: Mar. 17, 1997

Related U.S. Application Data

[63] Continuation of application No. 08/558,244, Nov. 17, 1995, abandoned.

[51] Int. Cl.[7] .................................................. G03G 15/00
[52] U.S. Cl. ........................................ 399/162; 399/130
[58] Field of Search .......................... 399/51, 130, 159, 399/162, 165, 177; 358/296, 300; 347/112, 115, 116

[56] References Cited

U.S. PATENT DOCUMENTS

| | | |
|---|---|---|
| 3,156,129 | 11/1964 | Greiner, Jr. . |
| 3,161,283 | 12/1964 | Knab et al. .............................. 198/202 |
| 3,407,673 | 10/1968 | Slezak ....................................... 74/241 |
| 3,789,552 | 2/1974 | Bradbury et al. .................... 51/135 BT |
| 4,021,031 | 5/1977 | Meihofer et al. ......................... 226/20 |
| 4,077,579 | 3/1978 | Seleski et al. .......................... 242/57.1 |
| 4,170,175 | 10/1979 | Conlon, Jr. .................................. 101/1 |
| 4,196,803 | 4/1980 | Lovett ..................................... 198/806 |
| 4,337,598 | 7/1982 | Barth et al. ......................... 51/135 BT |
| 4,344,693 | 8/1982 | Hamaker . |
| 4,462,676 | 7/1984 | Shimura et al. . |
| 4,494,865 | 1/1985 | Andrus et al. ............................ 355/32 |
| 4,527,686 | 7/1985 | Satoh ....................................... 198/807 |
| 4,893,740 | 1/1990 | Hediger et al. ........................... 226/23 |
| 4,912,491 | 3/1990 | Hoshino et al. . |
| 5,175,570 | 12/1992 | Haneda et al. . |
| 5,184,424 | 2/1993 | Miller .................................. 51/135 BT |
| 5,257,037 | 10/1993 | Haneda et al. . |
| 5,260,725 | 11/1993 | Hammond . |
| 5,278,587 | 1/1994 | Strauch et al. . |
| 5,302,973 | 4/1994 | Costanza et al. ....................... 346/108 |
| 5,319,537 | 6/1994 | Powers et al. ...................... 347/116 X |
| 5,339,150 | 8/1994 | Hubble, III et al. ............... 355/326 R |
| 5,351,070 | 9/1994 | Hinton et al. . |
| 5,369,477 | 11/1994 | Foote et al. . |
| 5,381,167 | 1/1995 | Fujii et al. ............................... 346/157 |
| 5,394,223 | 2/1995 | Hart et al. .......................... 347/116 X |
| 5,412,409 | 5/1995 | Costanza ................................. 347/118 |
| 5,442,388 | 8/1995 | Schieck .................................. 347/116 |
| 5,450,119 | 9/1995 | Hinton et al. ........................... 347/242 |
| 5,510,877 | 4/1996 | deJong et al. . |

FOREIGN PATENT DOCUMENTS

| | | |
|---|---|---|
| 0 547 854 | 6/1993 | European Pat. Off. . |
| 0 619 528 | 10/1994 | European Pat. Off. . |
| 0 679 018 | 10/1995 | European Pat. Off. . |
| 4016979 | 1/1992 | Japan . |
| 4181276 | 6/1992 | Japan . |

Primary Examiner—Sandra Brase
Attorney, Agent, or Firm—William D. Bauer

[57] ABSTRACT

A system for registration of one or more color separation images on a photoconductor belt prevents misregistration that otherwise can occur between different scan lines and between different latent images due to side-to-side movement of the photoconductor belt. The registration system operates to detect movement of the photoconductor belt. Based on the detected movement, the system operates to control modulation of laser beams used to form the latent images to ensure precise registration of the color separation images. As one advantage, the movement of the photoconductor belt can be detected precisely and inexpensively by a photodetector scanned with the same laser beam used for imaging.

25 Claims, 4 Drawing Sheets

SYSTEM FOR REGISTRATION OF COLOR SEPARATION IMAGES ON A PHOTOCONDUCTOR BELT

This is a continuation of application Ser. No. 08/558,244 filed Nov. 17, 1995 now abandoned.

FIELD

The present invention relates to multi-color imaging and, more particularly, to techniques for registering one or more color separation images on a photoconductor belt.

BACKGROUND

In a multi-color electrophotographic imaging system, latent images are formed in an imaging region of a moving photoconductor. Each of the latent images is representative of one of a plurality of different color separation images. The color separation images together define an overall multi-color image. The color separation images may define, for example, yellow, magenta, cyan, and black components that, upon subtractive combination on output media, produce a visible representation of the multi-color image. Prior to an imaging cycle, a uniform charge is applied to the surface of the photoconductor. Each of the latent images is formed by scanning a modulated laser beam across the moving photoconductor to selectively discharge the photoconductor in an image-wise pattern. Appropriately colored developers are applied to the photoconductor after each latent image is formed to develop the latent images. The resulting color separation images ultimately are transferred to the output media to form the multi-color image.

In some electrophotographic imaging systems, the latent images are formed and developed on top of one another in a common imaging region of the photoconductor. The latent images can be formed and developed in multiple passes of the photoconductor around a continuous transport path. Alternatively, the latent images can be formed and developed in a single pass of the photoconductor. A single-pass system enables multi-color images to be assembled at extremely high speeds. An example of an electrophotographic imaging system configured to assemble a multi-color image in a single pass of a photoconductor is disclosed in copending and commonly assigned U.S. patent application Ser. No. 08/537,296, to Kellie et al., filed Sep. 29, 1995, and entitled "METHOD AND APPARATUS FOR PRODUCING A MULTI-COLORED IMAGE IN AN ELECTROPHOTOGRAPHIC SYSTEM."

In an electrophotographic imaging system as described above, the latent images must be formed in precise registration with one another to produce a high quality image. In systems incorporating a photoconductor belt, precise registration can be difficult due to deviation of the belt from the transport path in a direction perpendicular to the transport path. Specifically, the photoconductor belt can undergo side-to-side movement during travel. The imaging region in which the latent images are formed is fixed relative to the edge of the photoconductor belt. However, the scanning beam used to form each latent image in the imaging region is fixed relative to a start-of-scan coordinate. The side-to-side movement of the photoconductor belt can cause movement of the imaging region relative to the start-of-scan coordinate. As a result, misregistration can occur between different scan lines and between different latent images. This misregistration can significantly degrade image quality. In particular, the misregistration can produce visible artifacts in the final multi-color image upon transfer of the misregistered color separation images to the output media.

SUMMARY OF THE INVENTION

The present invention is directed to a system for registration of one or more color separation images on a photoconductor belt. The system of the present invention prevents misregistration that otherwise can occur between different scan lines and between different latent images due to side-to-side movement of the photoconductor belt. The system thereby maintains image quality in a final multi-color image produced upon transfer of the developed color separation images to output media.

In a first embodiment, the present invention provides a system for registration of a latent image relative to an edge of a moving photoconductor belt, the system comprising a photodetector disposed adjacent the edge of the photoconductor belt, wherein the photodetector overlaps the edge of the photoconductor belt, a scanner for scanning a laser beam in a plurality of scan lines across the moving photoconductor belt and across the photodetector, the photodetector generating a belt edge detection signal when the laser beam is scanned across the photodetector, a first controller for modulating the laser beam based on image data to form the latent image on the photoconductor belt with a plurality of image scan segments, each of the image scan segments forming part of one of the scan lines, and a second controller for controlling the modulation of the laser beam based on the belt edge detection signal to start each of the image scan segments at a substantially fixed distance relative to the edge of the photoconductor belt.

In a second embodiment, the present invention provides a system for registration of a plurality of latent images relative to an edge of a moving photoconductor belt, the system comprising a photodetector disposed adjacent the edge of the photoconductor belt, wherein the photodetector overlaps the edge of the photoconductor belt, a first scanner for scanning a first laser beam in a plurality of first scan lines across the moving photoconductor belt and across the photodetector, wherein the photodetector generates a belt edge detection signal when the first laser beam is scanned across the photodetector, a second scanner for scanning a second laser beam in a plurality of second scan lines across the moving photoconductor belt, a first controller for modulating the first laser beam based on first image data to form a first latent image on the photoconductor belt with a plurality of first image scan segments, each of the first image scan segments forming part one of the first scan lines, and for modulating the second laser beam based on second image data to form a second latent image on the photoconductor belt with a plurality of second image scan segments, each of the second image scan segments forming part one of the second scan lines, and a second controller for controlling the modulation of the first laser beam based on the belt edge detection signal to start each of the first image scan segments at a substantially fixed distance relative to the edge of the photoconductor belt, and for controlling the modulation of the second laser beam based on the belt edge detection signal to start each of the second image scan segments at the substantially fixed distance relative to the edge of the photoconductor belt.

In a third embodiment, the present invention provides a system for registration of a latent image relative to an edge of a moving photoconductor belt, the system comprising a photodetector disposed adjacent the edge of the photoconductor belt, wherein the photodetector overlaps the edge of the photoconductor belt, a first scan means for scanning a first laser beam in a plurality of first scan lines across the moving photoconductor belt, a second scan means for scanning a second laser beam in a plurality of second scan lines across the photodetector and across at least a portion of the photoconductor belt, the photodetector generating a belt edge detection signal when the second laser beam is scanned across the photodetector, a first controller for modulating the first laser beam based on image data to form the latent image on the photoconductor belt with a plurality of image scan segments, each of the image scan segments forming part of one of the first scan lines, and a second controller for controlling the modulation of the first laser beam based on the belt edge detection signal to start each of the image scan segments at a substantially fixed distance relative to the edge of the photoconductor belt.

In a fourth embodiment, the present invention provides a system for registration of a plurality of latent images relative to an edge of a moving photoconductor belt, the system comprising a photodetector disposed adjacent the edge of the photoconductor belt, wherein the photodetector overlaps the edge of the photoconductor belt, a first scan means for scanning a first laser beam in a plurality of first scan lines across the moving photoconductor belt, a second scan means for scanning a second laser beam in a plurality of second scan lines across the moving photoconductor belt, a third scan means for scanning a third laser beam in a plurality of scan lines across the photodetector and across at least a portion of the photoconductor belt, wherein the photodetector generates a belt edge detection signal when the third laser beam is scanned across the photodetector, a first controller for modulating the first laser beam based on first image data to form a first latent image on the photoconductor belt with a plurality of first image scan segments, each of the first image scan segments forming part one of the first scan lines, and for modulating the second laser beam based on second image data to form a second latent image on the photoconductor belt with a plurality of second image scan segments, each of the second image scan segments forming part one of the second scan lines, and a second controller for controlling the modulation of the first laser beam based on the belt edge detection signal to start each of the first image scan segments at a substantially fixed distance relative to the edge of the photoconductor belt, and for controlling the modulation of the second laser beam based on the belt edge detection signal to start each of the second image scan segments at the substantially fixed distance relative to the edge of the photoconductor belt.

In a fifth embodiment, the present invention provides a system for registration of a latent image relative to an edge of a moving photoconductor belt, the system comprising a photodetector disposed adjacent the edge of the photoconductor belt, wherein the photodetector overlaps the edge of the photoconductor belt, means for scanning a laser beam in a plurality of scan lines across the moving photoconductor belt and across the photodetector, the photodetector generating a belt edge detection signal when the laser beam is scanned across the photodetector, means for modulating the laser beam based on image data to form the latent image on the photoconductor belt with a plurality of image scan segments, each of the image scan segments forming part of one of the scan lines, and means for controlling the modulation of the laser beam based on the belt edge detection signal to start each of the image scan segments at a substantially fixed distance relative to the edge of the photoconductor belt.

The advantages of the present invention will be set forth in part in the description that follows, and in part will be apparent from the description, or may be learned by practice of the present invention. The advantages of the present invention will be realized and attained by means particularly pointed out in the written description and claims, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION

Figure 1:
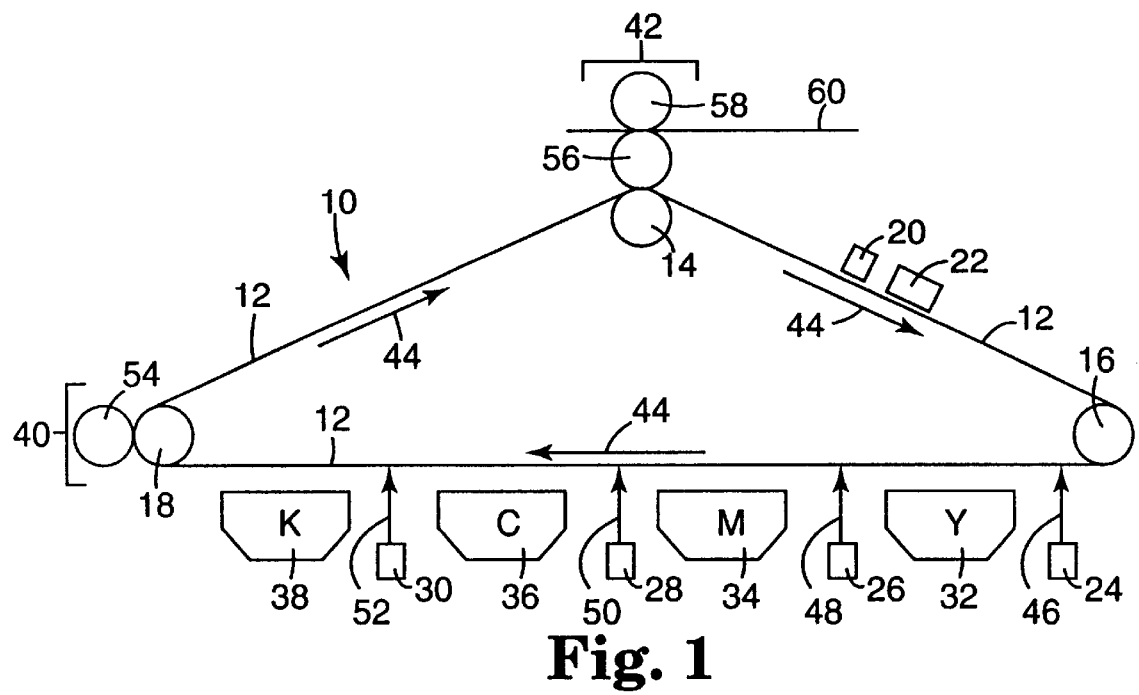
FIG. 1 is a schematic diagram conceptually illustrating an exemplary electrophotographic imaging system.

FIG. 1 is a schematic diagram conceptually illustrating an exemplary electrophotographic imaging system 10. In the example of FIG. 1, imaging system 10 includes a photoconductor belt 12 mounted about a plurality of rollers 14, 16, 18, an erasure station 20, a charging station 22, a plurality of scanners 24, 26, 28, 30, a plurality of development stations 32, 34, 36, 38, a drying station 40, and a transfer station 42. The imaging system 10 forms a multi-color image in a single pass of photoconductor belt 12around a continuous transport path. An imaging system capable of assembling a multi-color image in a single pass of a photoconductor is disclosed, for example, in copending and commonly assigned U.S. patent application Ser. No. 08/537,296, to Kellie et al., filed Sep. 29, 1995, and entitled "METHOD AND APPARATUS FOR PRODUCING A MULTI-COLORED IMAGE IN AN ELECTROPHOTOGRAPHIC SYSTEM." The entire content of the above-referenced patent application is incorporated herein by reference.

In operation of system 10, photoconductor belt 12 is driven to travel in a first direction indicated by arrows 44 along the continuous transport path. As photoconductor belt 12 moves along the transport path in first direction 44, erasure station 20 uniformly discharges any charge remaining on the belt from a previous imaging operation. The photoconductor belt 12 then encounters charging station 22, which uniformly charges the belt to a predetermined level. The scanners 24, 26, 28, 30 selectively discharge an imaging region of photoconductor belt 12 with laser beams 46, 48, 50, 52, respectively, to form latent electrostatic images. Each latent image is representative of one of a plurality of color separation images.

As shown in FIG. 1, each development station 32, 34, 36, 38 is disposed after one of scanners 24, 26, 28, 30, relative to the direction 44 of movement of photoconductor belt 12. Each of development stations 32, 34, 36, 38 applies a developer having a color appropriate for the color separation image represented by the particular latent image formed by the preceding scanner 24, 26, 28, 30. In the example of FIG. 1, development stations 32, 34, 36, 38 apply yellow, magenta, cyan, and black developers, respectively, to photoconductor belt 12. A suitable developer is disclosed, for example, in copending and commonly assigned U.S. patent application Ser. No. 08/536,856, to Baker et al., filed Sep. 29, 1995, entitled "LIQUID INK USING A GEL ORGANOSOL," and bearing attorney docket no. 52069USA8A. The entire content of the above-referenced patent application is incorporated herein by reference.

As photoconductor belt 12 continues to move in direction 44, the next scanner 26, 28, 30 begins to form a latent image in the imaging region in registration with the latent image formed by the preceding scanner and developed by the preceding development station 32, 34, 36. Thus, the color separation images are formed in the same imaging region in registration with one another. The scanners 24, 26, 28, 30 and development stations 32, 34, 36, 38 may be spaced such that an entire latent image is formed and developed prior to formation and development of the next latent image. For increased speed and reduced size, however, each scanner 26, 28, 30 and development station 34, 36, 38 preferably begins formation and development of the next latent image prior to complete formation and development of the preceding latent image.

After scanners 24, 26, 28, 30 and development stations 32, 34, 36, 38 have formed and developed the latent images, the imaging region of the moving photoconductor belt 12 encounters drying station 40. The drying station 40 may include a heated roller 54 that forms a nip with belt roller 18. The heated roller 54 applies heat to photoconductor belt 12 to dry the developer applied by development stations 32, 34, 36, 38. The imaging region of photoconductor belt 12 next arrives at transfer station 42. The transfer station 42 includes an intermediate transfer roller 56 that forms a nip with photoconductor belt 12 over belt roller 14 and a pressure roller 58 that forms a nip with the intermediate transfer roller. The developer on photoconductor belt 12 transfers from the photoconductor belt surface to intermediate transfer roller 56 by selective adhesion. The pressure roller 58 serves to transfer the image on intermediate transfer roller 56 to an output substrate 60 by application of pressure and/or heat to the output substrate. The output substrate 60 may comprise, for example, paper or film.

Figure 2:
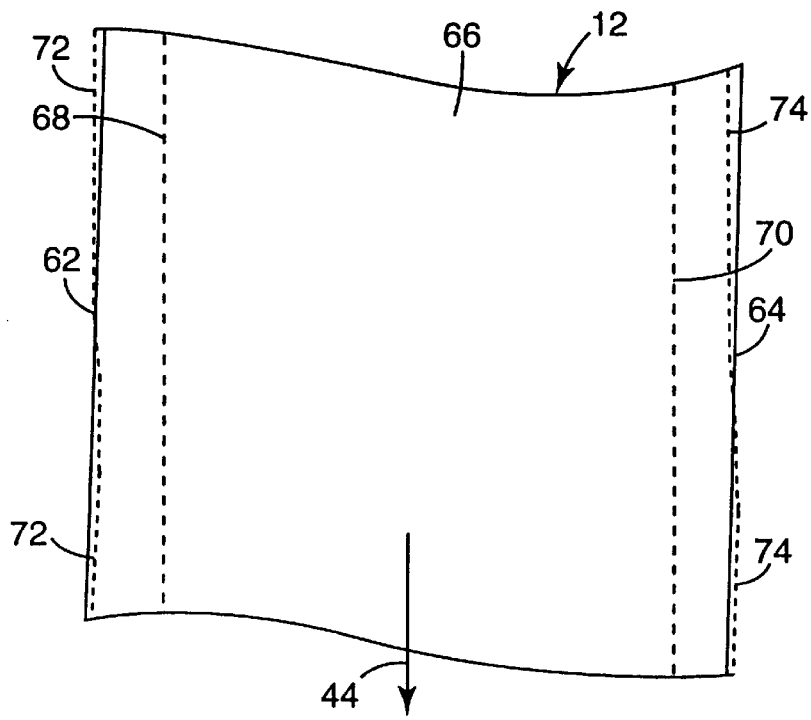
FIG. 2 is a top plan view of an exemplary photoconductor belt used in the electrophotographic imaging system of FIG. 1.

FIG. 2 is a top plan view of an exemplary photoconductor belt 12 for use in electrophotographic imaging system 10 of FIG. 1. As shown in FIG. 2, photoconductor belt 12 includes a left belt edge 62 and a right belt edge 64. The photoconductor belt 12 also includes an imaging region 66. The imaging region 66 includes a left margin 68 positioned at a fixed distance relative to left belt edge 62, and a right margin 70 positioned at a fixed distance relative to right belt edge 64. The left and right margins 68, 70 define the width of imaging region 66 extending in a direction perpendicular to the direction 44 of movement of photoconductor belt 12. The imaging region 66 also has a length defined by top and bottom margins not shown in FIG. 2.

Each scanner 24, 26, 28, 30 is oriented to scan the respective laser beam 46, 48, 50, 52 across the width of imaging region 66 in a scan line. Movement of photoconductor belt 12 in direction 44 relative to each scanner 24, 26, 28, 30 produces a plurality of scan lines on the belt. The laser beam is modulated based on image data representative of the latent image such that each of the scan lines includes an image scan segment. The image scan segments ideally extend between the left and right margins 68, 70 and together form a latent image in imaging region 66. The first and second belt edges 62, 64 ideally extend parallel to direction 44 of movement of photoconductor belt 12. As indicated by dashed lines 72, 74, however, photoconductor belt 12 can move from side to side during travel in direction 44, deviating slightly from the transport path.

To produce a high quality image, the latent images formed by scanners 24, 26, 28, 30 must be formed in precise registration with one another in imaging region 66. Precise registration can be difficult due to the side-to-side movement of photoconductor belt 12 during travel. The left and right margins 68, 70 of imaging region 66 are fixed relative to the left and right edges 62, 64, respectively, of photoconductor belt 12. In contrast, the scan lines and image scan segments of scanners 24, 26, 28, 30 generally are fixed relative to a start-of-scan coordinate. The side-to-side movement of photoconductor belt 12 can cause movement of imaging region 66 relative to the start-of-scan coordinate. As a result, misregistration can occur between different scan lines and between different latent images. This misregistration can significantly degrade image quality. In particular, the misregistration can produce visible artifacts in the ultimate multi-color image upon transfer of the misregistered color separation images to output substrate 60.

In accordance with the present invention, there is provided a system for registration of color separation images on photoconductor belt 12. The registration system of the present invention operates to detect a position of an edge of photoconductor belt 12, and control the laser beams 46, 48, 50, 52 scanned by scanners 24, 26, 28, 30 based on the detected position to ensure precise registration of the color separation images. In particular, the registration system operates to control modulation of each laser beam 46, 48, 50, 52 based on the detected movement to start each of the image scan segments at a fixed distance relative to one of edges 62, 64 of photoconductor belt 12. In this manner, the registration system of the present invention maintains the image quality of the multi-color image upon transfer of the registered color separation images to output substrate 60.

In the example of FIG. 1, imaging system 10 is a four-color imaging system. However, the registration system of the present invention can be readily applied to provide registration of any number of one or more latent images on a photoconductor belt. In addition, although imaging system 10 is shown as a multi-color/single-pass system in FIG. 1, the registration system of the present invention can be readily applied to multi-pass electrographic imaging systems requiring common registration of color separation images on a photoconductor belt. In a multi-pass imaging system, side-to-side movement of the photoconductor belt may be somewhat periodic. Thus, misregistration between consecutive latent images may be more predictable than in a single-pass system. Nevertheless, a registration system, in accordance with the present invention, is useful in a multi-pass system to improve image quality.

Figure 3:
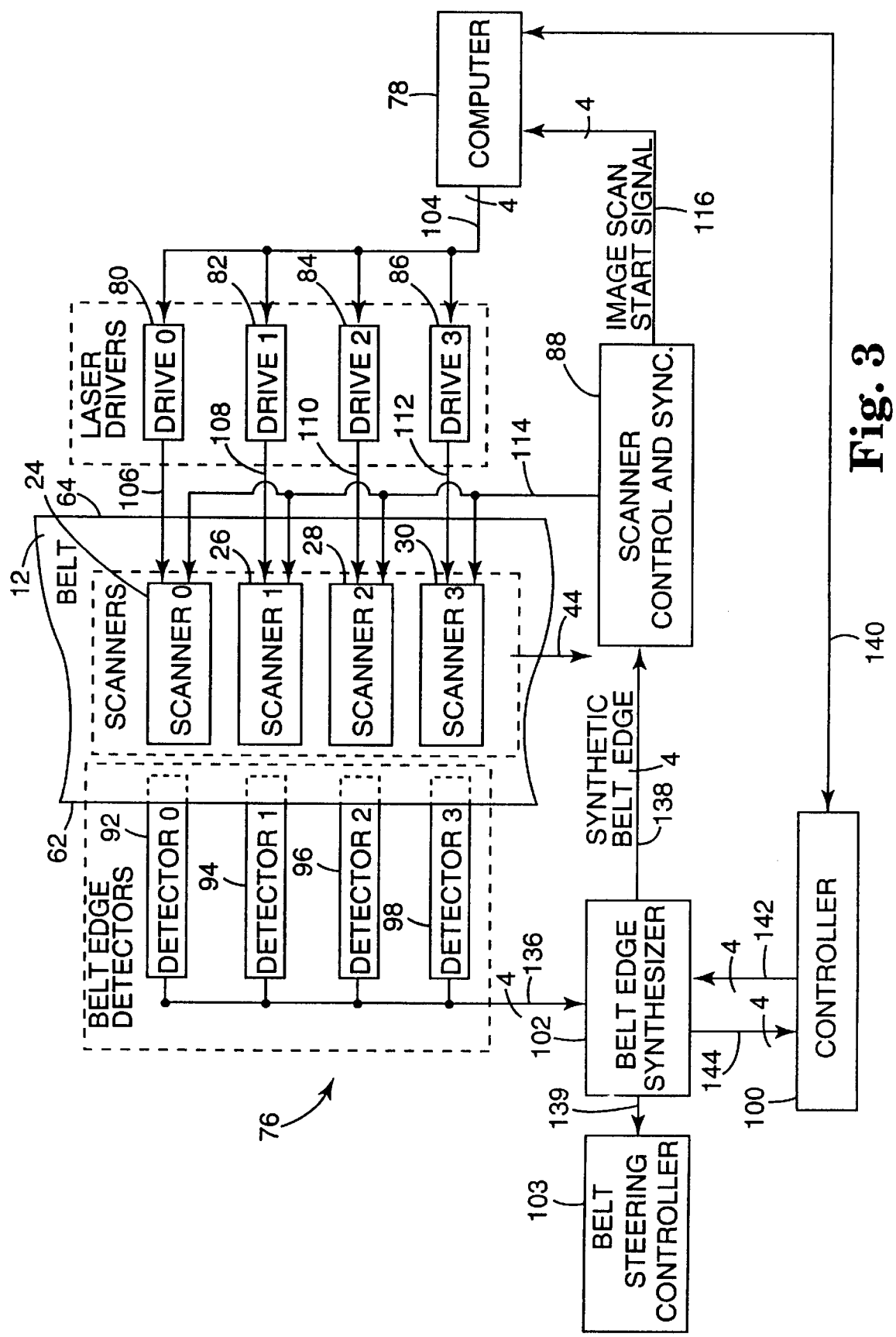
FIG. 3 is a functional block diagram illustrating a system for registration of one or more color separation images on a photoconductor belt, in accordance with the present invention.

FIG. 3 is a functional block diagram illustrating an exemplary embodiment of a system 76 for registration of color separation images on photoconductor belt 12, in accordance with the present invention. In the example of FIG. 3, registration system 76 includes scanners 24, 26, 28, 30, a computer 78, a plurality of laser drivers 80, 82, 84, 86, a scanner control and synchronization module 88, one or more belt edge detectors 92, 94, 96, 98, a controller 100, and a belt edge synthesizer 102. The registration system 76 of FIG. 3 provides registration of color separation images relative to an edge of the moving photoconductor belt 12. In the example of FIG. 3, registration system 76 provides registration relative to left edge 62. However, registration could be carried out relative to right edge 64.

In accordance with the present invention, each scanner 24, 26, 28, 30 is oriented to scan a laser beam 46, 48, 50, 52 in a scan line across photoconductor belt 12 and across a belt edge detection region adjacent to left edge 62 of the belt. The belt edge detection region alternatively could be disposed adjacent right belt edge 64. A portion of each of belt edge detectors 92, 94, 96, 98 is disposed in the belt edge detection region. The laser beam 46, 48, 50, 52 scanned by each scanner 24, 26, 28, 30 performs dual functions. Specifically, the laser beam 46, 48, 50, 52 is used to form a latent image on photoconductor belt 12, and to facilitate detection of left edge 62 by belt edge detectors 92, 94, 96, 98. The scanners 24, 26, 28, 30 advantageously provide both an inexpensive and precise light source for use in the belt edge detection process. The laser beams scanned by scanners 24, 26, 28, 30 enable detection of belt edge movement on the order of a fraction of a pixel size. In addition, belt detection can be synchronized relative to the pixel clock used for scanning.

The scanners 24, 26, 28, 30 scan laser beams 46, 48, 50, 52 on a "full-time" basis. Thus, even when a laser beam 46, 48, 50, 52 emitted by a particular scanner 24, 26, 28, 30 is not being modulated to form a latent image, the scanner is scanning the laser beam in a scan line for purposes of belt edge detection. The scan line provided by each scanner 24, 26, 28, 30 extends in a direction perpendicular to the direction 44 of movement of the photoconductor belt. Movement of photoconductor belt 12 in a direction 44 perpendicular to the scan line produces a plurality of scan lines across the photodetector belt. Each scanner 24, 26, 28, 30 may include, for example, a laser diode for emitting a laser beam 46, 48, 50, 52, a scanning mechanism for scanning the laser beam across photoconductor belt 12, and optics for focusing the laser beam on the photoconductor belt. The scanning mechanism may comprise, for example, a multi-faceted rotating mirror controlled by a scan drive motor.

As an alternative to the use of scanners 24, 26, 28, 30 for belt edge detection, one or more additional scanners could be incorporated and dedicated to belt edge detection. The use of scanners 24, 26, 28, 30 for both imaging and belt edge detection is, however, very cost effective, less complex, and facilitates synchronization of belt edge detection with the imaging scanning process. As a further alternative, a self-scanned pixel array could be used instead of a photodiode. The self-scanned pixel array would not require the use of either scanners 24, 26, 28, 30 or dedicated belt edge detection scanners for a light source. The self-scanned pixel array generally would be effective in detecting belt edge movement, but likely would not be capable of providing detection resolution on the order of that provided by a scanned laser beam. Moreover, the pixel array would add cost and complexity to the overall imaging system. Nevertheless, the use of a dedicated scanner or a self-scanned pixel array could be suitable for some applications.

The computer 78 serves as a first controller, in accordance with the present invention, that modulates the laser beam scanned by each scanner 24, 26, 28, 30 based on image data to form a latent image in imaging region 66 of photoconductor belt 12 with a plurality of image scan segments. Each of the image scan segments forms part of one of the scan lines. The computer 78 modulates the laser beam via laser drivers 80, 82, 84, 86, as indicated by line 104. The laser diode drivers 80, 82, 84, 86 drive the inputs of the laser diodes associated with scanners 24, 26, 28, 30, respectively, as indicated by lines 106, 108, 110, 112. The computer 78 modulates the laser beam to start each of the image scan segments at a particular point along the scan line. With reference to FIG. 2, each of the image scan segments ideally is started at left margin 68 of imaging region 66 for precise registration.

The scanner control and synchronization module 88 controls the scanning mechanism associated with each scanner 24, 26, 28, 30, as indicated by line 114. In particular, the scanner control and synchronization module 88 controls the scan rate of each scanning mechanism, and provides phase synchronization between the scanning mechanisms associated with the various scanners 24, 26, 28, 30. The scanner control and synchronization module 88 also generates an image scan start signals for each scanner, as indicated by line 116. The image scan start signals provide computer 78 with an indication of the start of each image scan segment relative to a start-of-scan coordinate. The computer 78 controls the modulation of the laser beams 46, 48, 50, 52 scanned by scanners 24, 26, 28, 30 in response to the image scan start signals to start the image scan segment at an appropriate position relative to the start of each scan line.

Figure 4:
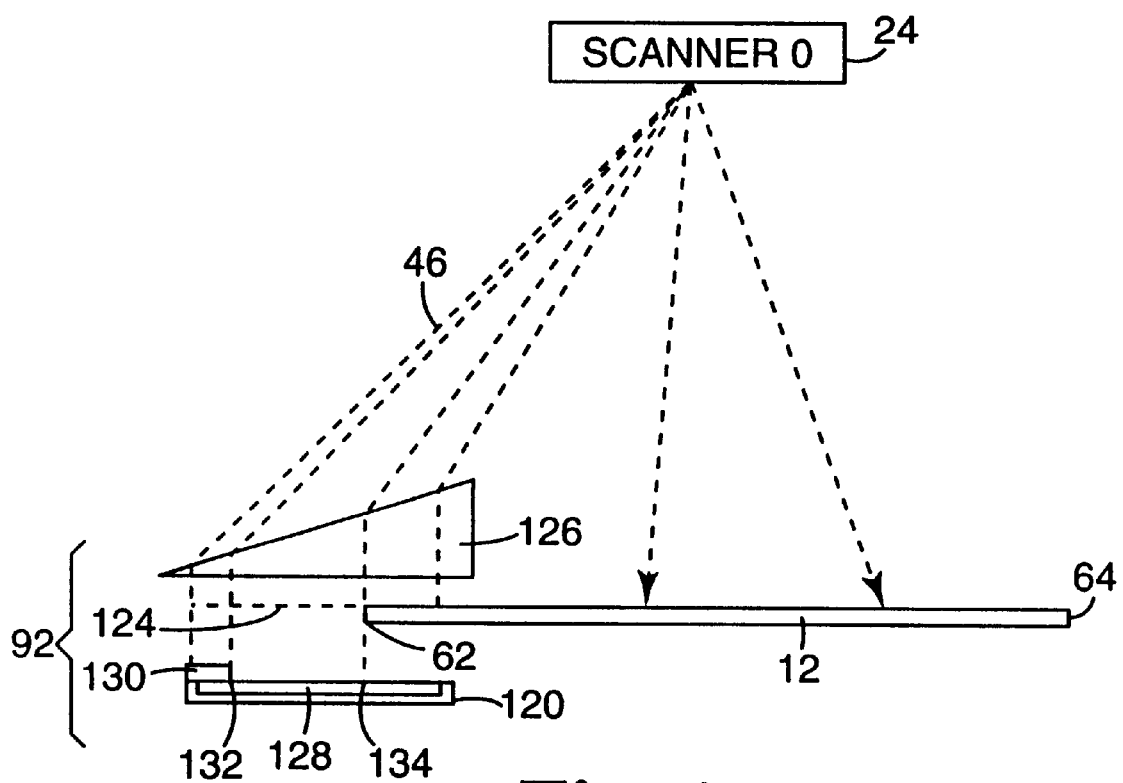
FIG. 4 is a schematic diagram illustrating an example of a belt edge detector for use with a registration system, in accordance with the present invention.

FIG. 4 is a schematic diagram illustrating an example of one of belt edge detectors 92, 94, 96, 98. As shown in FIG. 4, belt edge detector 92 includes a photodetector 120 that is disposed adjacent to left edge 62 of photoconductor belt 12, and on a side of the photoconductor belt opposite scanner 24. As also shown in FIG. 4, scanner 24 scans laser beam 46 across photoconductor belt 12 and photodetector 120 in a scan line 124. The photodetector 120 is positioned in alignment with scanner 24 relative to the direction 44 of movement of photoconductor belt 12 to receive laser beam 46 during a portion of scan line 124. An optical means in the form of a correcting prism 126 is disposed between scanner 24 and photodetector 120. The correcting prism 126 also is disposed between scanner 24 and photoconductor belt 12. The correcting prism 126 overlaps photodetector 120 and left belt edge 62, and directs laser beam 46 to be incident on the photodetector and on the left belt edge at an angle substantially perpendicular to photoconductor belt 12. The correcting prism 126 receives laser beam 46 at a position above photoconductor belt 12, and thereby prevents premature obstruction of the laser beam by left edge 62 due to vertical movement of the belt. The correcting prism 126 thereby ensures that such vertical movement will not be mistakenly perceived as side-to-side movement of photoconductor belt 12.

The photodetector 120 in each belt edge detector 92, 94, 96, 98 may comprise a photodiode having an active region 128 that overlaps left edge 62 of photoconductor belt 12. The photodiode should be sensitive to the wavelengths of the laser beam scanned by scanner 24. The non-overlapping portion of active region 128 occupies the belt edge detection region adjacent to left edge 62. The degree of overlap varies with the degree of side-to-side movement of left edge 62. Thus, the width of active region 128 should be large enough to overlap left edge 62 to at least some degree for the entire range of side-to-side movement of photoconductor belt 12. An example of a suitable photodiode is the OSD 60-3T photodiode, commercially available from Centronic, Inc., of Newbury Park, Calif.

The photodetector 120 in each belt edge detector 92, 94, 96, 98 generates a belt edge detection signal when the laser beam 46, 48, 50, 52 from the adjacent scanner 24, 26, 28, 30 is scanned across the belt edge detection region of the photodetector. In this exemplary embodiment, each of belt edge detectors 92, 94, 96, 98 continues to generate the belt edge detection signal until the laser beam is incident on left edge 62 of photoconductor belt 12. Alternatively, each of belt edge detectors 92, 94, 96, 98 could be disposed adjacent to right belt edge 64. As shown in FIG. 4, photodetector 120 may include a reference mask 130 positioned over an edge of active region 128. The reference mask 130 provides a precise edge at which photodetector 120 first receives laser beam 46, as indicated by reference numeral 132. When laser beam 46 is incident on active region 128 adjacent reference mask 130, the belt edge detection signal undergoes a transition from a first amplitude to a second amplitude. The belt edge detection signal remains at the second amplitude until laser beam 46 is incident on left edge 62, as indicated by reference numeral 134. When laser beam 46 is incident on left edge 62, photoconductor belt 12 blocks incidence of the laser beam on photodetector 120. As a result, the belt edge detection signal undergoes a transition from the second amplitude to the first amplitude. Thus, the position of belt edge 62 determines the duration of the belt edge detection signal at the second amplitude. In turn, the duration of the belt edge detection signal at the second amplitude provides a representation of the position of belt edge 62.

With further reference to FIG. 3, each of belt edge detectors 92, 94, 96, 98 transmits the belt edge detection signal to belt edge synthesizer 102, as indicated by line 136. In this example, belt edge synthesizer 102 operates, in combination with controller 100, scanner control and synchronization module 88, and computer 78, as a second controller. The second controller controls the modulation of the laser beam 46, 48, 50, 52 scanned by each scanner 24, 26, 28, 30 based on the belt edge detection signal generated by at least one of belt edge detectors 92, 94, 96, 98 to start each of the image scan segments at a substantially fixed distance relative to left edge 62 of photoconductor belt 12. In particular, belt edge synthesizer 102 transmits synthetic belt edge value signals for each scanner and for each scan line to scanner control and synchronization module 88, as indicated by line 138, based on the belt edge detection signals received from belt edge detectors 92, 94, 96, 98. The scanner control and synchronization module 88 generates the image scan start signals for each scanner based on the synthetic belt edge value signals and transmits the image scan start signals to computer 78, as indicated by line 116. The computer 78 controls the timing of modulation of the laser beam 46, 48, 50, 52 for each scanner 24, 26, 28, 30 based on the image scan start signals to start each of the image scan segments at the substantially fixed distance relative to left edge 62 of the photoconductor belt 12.

The controller 100 may comprise, for example, a microprocessor or a programmable logic circuit. Prior to operation, computer 78 downloads a belt edge detection program to controller 100, as indicated by line 140. As an alternative, the belt edge detection program could be stored in a nonvolatile memory associated with controller 100. The controller 100 executes the program to control the operation of belt edge synthesizer 102. The belt edge synthesizer 102 may comprise, for example, a plurality of counters. Each counter corresponds to one of belt edge detectors 92, 94, 96, 98. The controller 100 loads each counter with an existing synthetic belt edge value, as indicated by line 142. The existing synthetic belt edge value is representative of a position of left edge 62 of photoconductor belt 12.

Each counter in belt edge synthesizer 102 begins counting down from the existing synthetic belt edge value at a known clock rate when the belt edge detection signal generated by the appropriate belt edge detector 92, 94, 96, 98 transitions to the second amplitude, indicating the first incidence of laser beam 46 on active region 128. The clock rate of the counters and the synthetic belt edge value are determined based on the pixel clock rate and the pixel size. In particular, the counter clock rate and synthetic belt edge value preferably are set sufficiently high to detect spatial movement of photoconductor belt 12 in gradations on the order of fractions of a pixel dimension. As an example, it is assumed that each scan line is formed with 600 pixels per inch (236 pixels per centimeter) at a pixel clock rate of $18 \times 10^6$ pixels per second, and that the position of left belt edge 62 ideally is 0.125 inches (0.317 centimeters) from reference mask 130. To detect spatial movement in gradations on the order of $\frac{1}{6}$ of a pixel dimension (0.00028 inches or 0.0007 centimeters), the counters could be loaded with a synthetic belt edge value of 855 and counted down at a clock rate of 100 MHz.

The counter stops counting down when the appropriate belt edge detection signal transitions to the first amplitude, indicating incidence of laser beam 46 on left belt edge 62, or when the counter value has reached zero, whichever is later. If the belt edge detection signal transitions to the first amplitude prior to the counter reaching zero, the counter continues counting, but the count value at the time of transition is latched as a representation of the actual position of belt edge 62. If the belt edge detection signal transitions to the first amplitude after the counter has reached zero, the counter stops counting, and the "wrap-around" count value at the time of transition forms a representation of the actual position of belt edge 62. In either case, the final count value indicates the error between the actual belt edge position and the belt edge position represented by the synthetic belt edge value. The belt edge synthesizer 102 provides controller 100 with the count values from the various counters, as indicated by line 144. If the count value is greater than zero, left belt edge 62 has moved to the left to some degree. If the count value is less than zero, i.e., the counter has wrapped around and indicates a negative number, left belt edge 62 has moved to the right to some degree. For precise registration, the image scan segment of laser beam 46 must be shifted to the right or left as a function of the actual movement of left belt edge 62. To quantify the shift for computer 78, controller 100 generates a new synthetic belt edge value and reloads the counters in belt edge synthesizer 102 with the new synthetic belt edge value, as indicated by line 142.

The belt edge synthesizer 100 transmits the new synthetic belt edge value to scan control and synchronization module 88. The controller 100 and belt edge synthesizer 102 could generate the synthetic belt edge value with a single counter based on the belt edge detection signal generated by a single belt edge detector 92, 94, 96, 98. In the example of FIG. 3, however, four belt edge detectors 92, 94, 96, 98 are positioned along the length of photoconductor belt 12 and aligned with respective scanners 24, 26, 28, 30. The use of four belt edge detectors 92, 94, 96, 98 facilitates identification of defects in left belt edge 62 by comparison of the outputs of the various belt edge detectors. Defects such as indentations could exist along left belt edge 62 due to damage during use or imprecise manufacturing. A defect could cause a single belt edge detector to detect a false position for left belt edge 62. To avoid the detection of false belt edge positions, it is desirable to filter out belt edge detection signals generated as a result of defects. In the example of FIG. 3, controller 100 processes the counter values generated by belt edge synthesizer 102 for each of belt edge detectors 92, 94, 96, 98 to identify those signals associated with defects.

Figure 5:
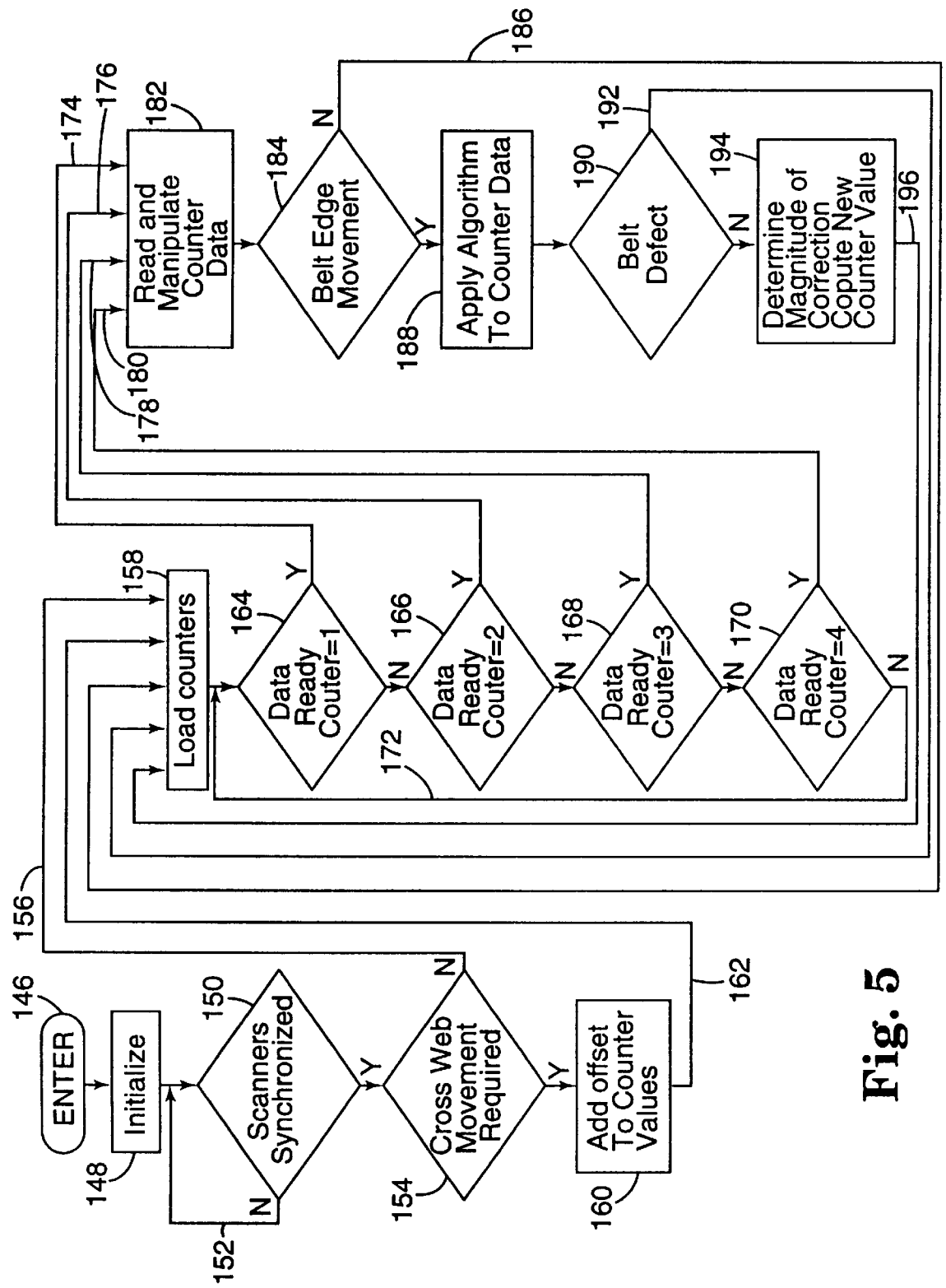
FIG. 5 is a flow diagram illustrating operation of an exemplary belt edge detection process implemented by a registration system, in accordance with the present invention.

FIG. 5 is a flow diagram illustrating operation of a belt edge detection process implemented by a registration system, in accordance with the present invention. FIG. 5 illustrates, in particular, the operation of controller 100 and belt edge synthesizer 102 under the control of controller 100. As shown in FIG. 5, upon start-up, indicated by block 146, computer 78 first initializes system 76, as indicated by block 148. At initialization, computer 78 downloads the belt edge detection program to controller 100, as indicated by line 140 in FIG. 3. Alternatively, the belt edge detection program could reside in non-volatile memory associated with controller 100. As indicated by block 150 in FIG. 5, controller 100 determines whether the various scanners 24, 26, 28, 30 are synchronized with one another. If scanners 24, 26, 28, 30 are not synchronized, controller 100 waits for synchronization, as indicated by loop 152. Upon synchronization, controller 100 determines whether a cross-web movement is required, as indicated by block 154. Cross-web movement refers to a shift in a direction perpendicular to the direction 44 of movement of belt 12. The controller 100 adds a cross-web movement to the images formed by the respective scanner 24, 26, 28, 30 as necessary to correct for spatial misalignment of the reference masks 130 of belt edge detectors 92, 94, 96, 98.

The controller 100 implements the shift, if necessary, by adjusting the synthetic belt edge value loaded into the counter associated with the particular scanner 24, 26, 28, 30 in need of correction. If no cross-web movement is required, controller 100 does not adjust the existing synthetic belt edge value. Rather, controller 100 proceeds to load the counters in belt edge synthesizer 102 with the existing synthetic belt edge value, as indicated by line 156 and block 158. If cross-web movement is required, controller 100 adjusts the synthetic belt edge value with an offset that reflects the degree of movement necessary for correction, as indicated by block 160. The controller 100 then loads the appropriate counters in belt edge synthesizer 102 with adjusted synthetic belt edge values, as indicated by line 162 and block 158.

The belt edge synthesizer 102 then waits for scanners 24, 26, 28, 30 to begin scanning laser beam 46 across active region 128 of photodetector 120, and for the respective counters to produce a final count value, as indicated by blocks 164, 166, 168, 170, and loop 172. When a counter provides a final count value for the scan line, belt edge synthesizer 102 provides the final count value to controller 100, as indicated by lines 174, 176, 178, 180. The controller 100 processes the final count values, as indicated by block 182, and determines whether the final count values are representative of movement of left belt edge 62, as indicated by block 184. The controller 100 determines whether movement has occurred by comparing the final count value to the existing synthetic belt edge value. As previously described, if the count value is greater than zero, left belt edge 62 has moved to the left to some degree. If the count value is less than zero, i.e., the counter has wrapped around, left belt edge 62 has moved to the right to some degree. If the count value is exactly zero, no movement has occurred. If no movement has occurred, controller 100 reloads the counters with the existing synthetic belt edge values, as indicated by line 186. The belt edge synthesizer 102 then transmits the existing synthetic belt edge values to scan control and synchronization module 88, as indicated by line 138.

If controller 100 determines that left belt edge 62 has moved, the controller applies an algorithm to the final counter values to filter out values resulting from belt edge detection signals associated with defects in the left belt edge, as indicated by block 188. The algorithm enables controller 100 to disregard the belt edge detection signals associated with such defects for control of the modulation of the laser beams. The algorithm determines if actual belt motion has occurred by determining the rate of change in the final counter value for the counters associated with each of scanners 24, 26, 28, 30. The algorithm saves a delta count value representing a change in the count value between the previous two scan lines for each counter. The algorithm compares the saved delta count value to a delta count value representing a change in the count value between the present scan line and the previous scan line.

If the delta count value for a counter associated with a particular scanner 24, 26, 28, 30 indicates that belt movement has occurred, the algorithm interrogates the other three counters in the same manner to determine if a similar delta count value has been observed. If only one counter has observed a change in the delta count value, a belt defect has been encountered. In this case, the counter is loaded with the previous synthetic belt edge value, which does not provide any correction for belt movement. If all four counters indicate a similar delta count value, however, actual belt movement has occurred. In this case, each of the counters is loaded with a new synthetic belt edge value representing a necessary correction for belt movement. Thus, based on the algorithm, controller 100 identifies final count values for belt edge detection signals associated with defects, as indicated by block 190. If the algorithm indicates that a final count value is the result of a belt edge defect, controller 100 disregards the final count value. In this case, controller 100 reloads the counters with the existing synthetic belt edge value, as indicated by line 192. If the algorithm indicates that the final count value is not the result of a belt edge defect, controller 100 determines the magnitude of the correction required by the laser beams, as indicated by block 194. The controller 100 adjusts the existing synthetic belt edge values according to the necessary correction, and reloads the counters in belt edge synthesizer 102 with the new synthetic belt edge values, as indicated by line 196. It may be desirable to set a maximum correction value per scan line to avoid sudden adjustments that could be visible in the final multi-color image.

The belt edge synthesizer 102 provides each new synthetic belt edge value to scan control and synchronization module 88. In response, scan control and synchronization module 88 generates image scan start signals at an appropriate time relative to the start of scan of each of scanners 24, 26, 28, 30. The computer 78 starts modulation of each laser beam in response to the image scan start signals for the particular laser beam. Based on the synthetic belt edge value and a pixel clock, scan control and synchronization module 88 times the image scan start signals for each scanner 24, 26, 28, 30 so that computer 78 controls the modulation of each laser beam to start each of the image scan segments at a substantially fixed distance relative to the left edge 62 of photoconductor belt 12. In this manner, computer 78 controls the modulation of each laser beam 46, 48, 50, 52 based on the belt edge detection signal generated by the scan line of the particular laser beam.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A system for registration of a latent image relative to an edge of a moving photoconductor belt, the system comprising:

a photodetector disposed adjacent the edge of the photoconductor belt, wherein the photodetector overlaps the edge of the photoconductor belt;

a scanner for scanning a laser beam in a plurality of scan lines across the moving photoconductor belt and across the photodetector, the photodetector generating a belt edge detection signal when the laser beam is scanned across the photodetector;

a first controller for modulating the laser beam based on image data to form the latent image on the photoconductor belt with a plurality of image scan segments, each of the image scan segments forming part of one of the scan lines;

a second controller for controlling the modulation of the laser beam based on the belt edge detection signal to start each of the image scan segments at a substantially fixed distance relative to the edge of the photoconductor belt; and an optical device, disposed between the scanner and the photodetector, that directs the laser beam to be incident on the photodetector and the photoconductor belt at an angle substantially perpendicular to the photoconductor belt.

2. The system of claim 1, wherein the optical device includes a prism disposed between the scanner and the photoconductor belt, wherein the prism overlaps the photodetector and the edge of the photoconductor belt.

3. The system of claim 1, wherein the second controller is configured to compare a difference between values of the belt edge detection signal for adjacent portions of the photoconductor belt to a threshold, the second controller disregarding the value of the belt edge detection signal for at least one of the adjacent portions in the event the difference exceeds the threshold, thereby eliminating error in the belt edge detection signal due to defects in the edge of the photoconductor belt.

4. A system for registration of a latent image relative to an edge of a moving photoconductor belt, the system comprising:

a photodetector disposed adjacent the edge of the photoconductor belt, wherein the photodetector overlaps the edge of the photoconductor belt;

a scanner for scanning a laser beam in a plurality of scan lines across the moving photoconductor belt and across the photodetector, the photodetector generating a belt edge detection signal when the laser beam is scanned across the photodetector;

a first controller for modulating the laser beam based on image data to form the latent image on the photoconductor belt with a plurality of image scan segments, each of the image scan segments forming part of one of the scan lines;

a second controller for controlling the modulation of the laser beam based on the belt edge detection signal to start each of the image scan segments at a substantially fixed distance relative to the edge of the photoconductor belt; and an optical device, disposed between the scanner and the photodetector, that directs the laser beam to be incident on the photodetector and the photoconductor belt at an angle substantially perpendicular to the photoconductor belt, wherein the photodetector continues to generate the belt edge detection signal until the laser beam is incident on the edge of the photoconductor belt, and wherein the second controller includes means for determining a position of the edge of the photoconductor belt based on a duration of the belt edge detection signal, the second controller controlling the modulation of the laser beam based on the determined position.

5. A system for registration of a plurality of latent images relative to an edge of a moving photoconductor belt, the system comprising:

a photodetector disposed adjacent the edge of the photoconductor belt, wherein the photodetector overlaps the edge of the photoconductor belt;

a first scanner for scanning a first laser beam in a plurality of first scan lines across the moving photoconductor belt and across the photodetector, wherein the photodetector generates a belt edge detection signal when the first laser beam is scanned across the photodetector;

a second scanner for scanning a second laser beam in a plurality of second scan lines across the moving photoconductor belt;

a first controller for modulating the first laser beam based on first image data to form a first latent image on the photoconductor belt with a plurality of first image scan segments, each of the first image scan segments forming part one of the first scan lines, and for modulating the second laser beam based on second image data to form a second latent image on the photoconductor belt with a plurality of second image scan segments, each of the second image scan segments forming part one of the second scan lines;

a second controller for controlling the modulation of the first laser beam based on the belt edge detection signal to start each of the first image scan segments at a substantially fixed distance relative to the edge of the photoconductor belt, and for controlling the modulation of the second laser beam based on the belt edge detection signal to start each of the second image scan segments at the substantially fixed distance relative to the edge of the photoconductor belt; and an optical device, disposed between the first scanner and the photodetector, that directs the first laser beam to be incident on the photodetector and the photoconductor belt at an angle substantially perpendicular to the photoconductor belt.

6. The system of claim 5, wherein the optical device includes a prism disposed between the first scanner and the photoconductor belt, wherein the prism overlaps the photodetector and the edge of the photoconductor belt.

7. The system of claim 5, wherein the photodetector is a first photodetector and the belt edge detection signal is a first belt edge detection signal, the system further comprising a second photodetector disposed adjacent the edge of the photoconductor belt along the direction of movement of the photoconductor belt, the second photodetector overlapping the edge of the photoconductor belt, wherein the second scanner scans the second laser beam in the plurality of second scan lines across the moving photoconductor belt and across the second photodetector, and wherein the second photodetector generates a second belt edge detection signal when the second laser beam is scanned across the second photodetector, the second controller controlling the modulation of the first laser beam and the second laser beam based on the first belt edge detection signal and the second belt edge detection signal.

8. The system of claim 5, further comprising a third scanner for scanning a third laser beam in a plurality of third scan lines across the moving photoconductor belt, the first controller modulating the third laser beam based on third image data to form a third latent image on the photoconductor belt with a plurality of third image scan segments, each of the third image scan segments forming part of the third scan lines, and the second controller controlling the modulation of the third laser beam based on the belt edge detection signal to start each of the third image scan segments at a substantially fixed distance relative to the edge of the photoconductor belt.

9. The system of claim 8, further comprising a fourth scanner for scanning a fourth laser beam in a plurality of fourth scan lines across the moving photoconductor belt, the first controller modulating the fourth laser beam based on fourth image data to form a fourth latent image on the photoconductor belt with a plurality of fourth image scan segments, each of the fourth image scan segments forming part one of the fourth scan lines, and the second controller controlling the modulation of the fourth laser beam based on the belt edge detection signal to start each of the fourth image scan segments at a substantially fixed distance relative to the edge of the photoconductor belt.

10. A system for registration of a plurality of latent images relative to an edge of a moving photoconductor belt, the system comprising:

a photodetector disposed adjacent the edge of the photoconductor belt, wherein the photodetector overlaps the edge of the photoconductor belt;

a first scanner for scanning a first laser beam in a plurality of first scan lines across the moving photoconductor belt and across the photodetector, wherein the photodetector generates a belt edge detection signal when the first laser beam is scanned across the photodetector;

a second scanner for scanning a second laser beam in a plurality of second scan lines across the moving photoconductor belt;

a first controller for modulating the first laser beam based on first image data to form a first latent image on the photoconductor belt with a plurality of first image scan segments, each of the first image scan segments forming part one of the first scan lines, and for modulating the second laser beam based on second image data to form a second latent image on the photoconductor belt with a plurality of second image scan segments, each of the second image scan segments forming part one of the second scan lines;

a second controller for controlling the modulation of the first laser beam based on the belt edge detection signal to start each of the first image scan segments at a substantially fixed distance relative to the edge of the photoconductor belt, and for controlling the modulation of the second laser beam based on the belt edge detection signal to start each of the second image scan segments at the substantially fixed distance relative to the edge of the photoconductor belt; and an optical device, disposed between the first scanner and the photodetector, that directs the first laser beam to be incident on the photodetector and the photoconductor belt at an angle substantially perpendicular to the photoconductor belt, wherein the photodetector continues to generate the belt edge detection signal until the first laser beam is incident on the edge of the photoconductor belt, and wherein the second controller includes means for determining a position of the edge of the photoconductor belt based on a duration of the belt edge detection signal, the second controller controlling the modulation of the first laser beam and the second laser beam based on the determined position.

11. A system for registration of a latent image relative to an edge of a moving photoconductor belt, the system comprising:

a photodetector disposed adjacent the edge of the photoconductor belt, wherein the photodetector overlaps the edge of the photoconductor belt;

a first scan means for scanning a first laser beam in a plurality of first scan lines across the moving photoconductor belt;

a second scan means for scanning a second laser beam across the photodetector and across at least a portion of the photoconductor belt, the photodetector generating a belt edge detection signal when the second laser beam is scanned across the photodetector;

a first controller for modulating the first laser beam based on image data to form the latent image on the photoconductor belt with a plurality of image scan segments, each of the image scan segments forming part of one of the first scan lines;

a second controller for controlling the modulation of the first laser beam based on the belt edge detection signal to start each of the image scan segments at a substantially fixed distance relative to the edge of the photoconductor belt; and an optical device, disposed between the second scan means and the photodetector, that directs the second laser beam to be incident on the photodetector and the photoconductor belt at an angle substantially perpendicular to the photoconductor belt.

12. The system of claim 11, wherein the first scan means and the second scan means comprise a common scanner, and the first laser beam and the second laser beam comprise a common laser beam scanned across the photoconductor belt and the photodetector by the common scanner.

13. A system for registration of a plurality of latent images relative to an edge of a moving photoconductor belt, the system comprising:

a photodetector disposed adjacent the edge of the photoconductor belt, wherein the photodetector overlaps the edge of the photoconductor belt;

a first scan means for scanning a first laser beam in a plurality of first scan lines across the moving photoconductor belt;

a second scan means for scanning a second laser beam in a plurality of second scan lines across the moving photoconductor belt;

a third scan means for scanning a third laser beam across the photodetector and across at least a portion of the photoconductor belt, wherein the photodetector generates a belt edge detection signal when the third laser beam is scanned across the photodetector;

a first controller for modulating the first laser beam based on first image data to form a first latent image on the photoconductor belt with a plurality of first image scan segments, each of the first image scan segments forming part one of the first scan lines, and for modulating the second laser beam based on second image data to form a second latent image on the photoconductor belt with a plurality of second image scan segments, each of the second image scan segments forming part one of the second scan lines;

a second controller for controlling the modulation of the first laser beam based on the belt edge detection signal to start each of the first image scan segments at a substantially fixed distance relative to the edge of the photoconductor belt, and for controlling the modulation of the second laser beam based on the belt edge detection signal to start each of the second image scan segments at the substantially fixed distance relative to the edge of the photoconductor belt; and an optical device, disposed between the third scan means and the photodetector, that directs the third laser beam to be incident on the photodetector and the photoconductor belt at an angle substantially perpendicular to the photoconductor belt.

14. The system of claim 13, wherein the first scan means and the third scan means comprise a common scanner, and the first laser beam and the third laser beam comprise a common laser beam scanned across the photoconductor belt and the photodetector by the common scanner.

15. The system of claim 13, wherein the photodetector is a first photodetector and the belt edge detection signal is a first belt edge detection signal, the system further comprising a second photodetector disposed adjacent the edge of the photoconductor belt along the direction of movement of the photoconductor belt, the second photodetector overlapping the edge of the photoconductor belt, wherein the second scan means scans the second laser beam in the plurality of second scan lines across the moving photoconductor belt and across the second photodetector, and wherein the second photodetector generates a second belt edge detection signal when the second laser beam is scanned across the second photodetector, the second controller controlling the modulation of the first laser beam and the second laser beam based on the first belt edge detection signal and the second belt edge detection signal.

16. A system for registration of a latent image relative to an edge of a moving photoconductor belt, the system comprising:

a photodetector disposed adjacent the edge of the photoconductor belt, wherein the photodetector overlaps the edge of the photoconductor belt;

means for scanning a laser beam in a plurality of scan lines across the moving photoconductor belt and across the photodetector, the photodetector generating a belt edge detection signal when the laser beam is scanned across the photodetector;

means for modulating the laser beam based on image data to form the latent image on the photoconductor belt with a plurality of image scan segments, each of the image scan segments forming part of one of the scan lines;

means for controlling the modulation of the laser beam based on the belt edge detection signal to start each of the image scan segments at a substantially fixed distance relative to the edge of the photoconductor belt; and an optical device, disposed between the scanning means and the photodetector, that directs the laser beam to be incident on the photodetector and the photoconductor belt at an angle substantially perpendicular to the photoconductor belt.

17. A system for registration of a latent image relative to an edge of a moving photoconductor belt, the system comprising:

an image scanner which scans a laser beam across the edge of the photoconductor belt;

an optical device that directs the laser beam to be incident adjacent an edge of the photoconductor belt at an angle substantially perpendicular to the photoconductor belt; and means for controlling the image scanner for forming the latent image on the photoconductor belt.

18. The system of claim 17, further comprising means for generating a belt edge detection signal when the laser beam is scanned across the edge of the photoconductor belt.

19. The system of claim 18, wherein the means for generating a belt edge detection signal includes a photodetector extending from the edge of the belt.

20. The system of claim 19, further comprising a reference mask located adjacent the photodetector.

21. The system of claim 18, further comprising means responsive to the belt edge detection signal for controlling the position of the latent image on photoconductor belt relative to the edge of the belt.

22. A system for registration of a latent image on a photoconductor belt, the system comprising:

a photoconductor belt mounted about a plurality of rollers;

a drive mechanism for driving the photoconductor belt to move about the rollers in a continuous path, wherein the photoconductor belt tends to deviate from the continuous path in a lateral direction relative to a direction of movement of the photoconductor belt about the rollers;

a photodetector disposed to overlap an edge of the photoconductor belt;

a scanner for scanning a belt edge detection beam across the moving photoconductor belt and across the photodetector, the photodetector generating a belt edge detection signal when the belt edge detection beam is scanned across the photodetector;

a first controller for modulating an imaging beam based on image data to form a latent image on the photoconductor belt in a plurality of image scan segments;

a second controller for controlling the modulation of the imaging beam based on the belt edge detection signal to start each of the image scan segments at a substantially fixed distance relative to the edge of the photoconductor belt, wherein the second controller compares a difference between values of the belt edge detection signal for adjacent portions of the photoconductor belt to a threshold and disregards the value of the belt edge detection signal for at least one of the portions in the event the difference exceeds the threshold.

23. The system of claim 22, further comprising an optical device, disposed between the scanner and the photodetector, for directing the belt edge detection beam to be incident on the photodetector and the photoconductor belt at an angle substantially perpendicular to the photoconductor belt.

24. The system of claim 23, wherein the optical device includes a prism disposed between the scanner and the photoconductor belt.

25. The system of claim 23, wherein the belt edge detection beam is also the imaging beam.

* * * * *